US009904444B2

United States Patent
Cho et al.

(10) Patent No.: US 9,904,444 B2
(45) Date of Patent: Feb. 27, 2018

(54) METHOD OF PROVIDING USER INTERFACE OF DEVICE AND DEVICE INCLUDING THE USER INTERFACE

(71) Applicant: Samsung Electronics Co., Ltd., Suwon-si, Gyeonggi-do (KR)

(72) Inventors: Chi-hyun Cho, Seoul (KR); Kil-su Eo, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 204 days.

(21) Appl. No.: 14/285,134

(22) Filed: May 22, 2014

(65) Prior Publication Data

US 2015/0033159 A1 Jan. 29, 2015

(30) Foreign Application Priority Data

Jul. 23, 2013 (KR) ........................ 10-2013-0086996

(51) Int. Cl.
*G06F 3/0484* (2013.01)
*G06F 3/0481* (2013.01)
*G06F 1/16* (2006.01)

(52) U.S. Cl.
CPC ........ *G06F 3/04842* (2013.01); *G06F 1/1694* (2013.01); *G06F 3/04817* (2013.01)

(58) Field of Classification Search
CPC ..... G06F 3/0484; G06F 3/0481; G06F 3/0488
See application file for complete search history.

(56) References Cited

U.S. PATENT DOCUMENTS

| 7,401,300 | B2* | 7/2008 | Nurmi | G06F 1/1626 |
| | | | | 345/158 |
| 8,351,773 | B2* | 1/2013 | Nasiri | A63F 13/06 |
| | | | | 396/55 |
| 8,878,656 | B2* | 11/2014 | Tidemand | G06F 3/011 |
| | | | | 340/407.1 |
| 8,952,901 | B2* | 2/2015 | Kim | G06F 3/04883 |
| | | | | 178/18.01 |
| 2002/0054063 | A1* | 5/2002 | Nishina | G06F 3/0219 |
| | | | | 715/716 |
| 2005/0052406 | A1* | 3/2005 | Stephanick | G06F 3/0236 |
| | | | | 345/156 |
| 2009/0213134 | A1* | 8/2009 | Stephanick | G06F 3/0236 |
| | | | | 345/589 |
| 2009/0265627 | A1* | 10/2009 | Kim | G06F 1/1626 |
| | | | | 715/702 |
| 2010/0146444 | A1* | 6/2010 | Wang | G06F 3/0488 |
| | | | | 715/815 |

(Continued)

FOREIGN PATENT DOCUMENTS

| EP | 2 097 546 A1 | 9/2009 |
| JP | 2009-009261 A | 1/2009 |
| KR | 10-2008-0060981 A | 7/2008 |

*Primary Examiner* — David Choi
(74) *Attorney, Agent, or Firm* — Jefferson IP Law, LLP

(57) ABSTRACT

A device which provides a user interface through which a user further easily selects an object and a method of providing the user interface are provided. The device includes at least one sensor which senses a motion of the device, a processor which compares a motion value determined by using the sensor with a preset threshold value and determines a movement value of the object based on a result of the comparing, and an Input/Output (I/O) unit which displays the object, wherein the object moves according to the movement value of the object.

20 Claims, 6 Drawing Sheets

(56) References Cited

U.S. PATENT DOCUMENTS

| | | | |
|---|---|---|---|
| 2010/0188432 A1* | 7/2010 | Tsai | G06F 3/017 345/684 |
| 2010/0201615 A1* | 8/2010 | Tupman | G06F 1/1626 345/156 |
| 2010/0207873 A1* | 8/2010 | Lee | H04L 65/602 345/156 |
| 2010/0321286 A1* | 12/2010 | Haggerty | G06F 3/0418 345/156 |
| 2011/0109546 A1* | 5/2011 | Milne | G06F 1/1694 345/158 |
| 2011/0163955 A1* | 7/2011 | Nasiri | A63F 13/06 345/158 |
| 2011/0209090 A1* | 8/2011 | Meyvis | G06F 3/04886 715/822 |
| 2011/0231797 A1* | 9/2011 | Huhtala | G06F 1/1626 715/811 |
| 2012/0030566 A1* | 2/2012 | Victor | G06F 3/0482 715/702 |
| 2012/0102436 A1* | 4/2012 | Nurmi | G06F 1/1613 715/863 |
| 2012/0151415 A1* | 6/2012 | Park | G06F 3/04883 715/835 |
| 2012/0194424 A1* | 8/2012 | Orr | G01C 21/36 345/156 |
| 2012/0200510 A1* | 8/2012 | Pettey | G06F 3/0488 345/173 |
| 2013/0120319 A1* | 5/2013 | Givon | G06F 3/0425 345/175 |
| 2013/0265225 A1* | 10/2013 | Nasiri | A63F 13/06 345/156 |
| 2014/0317545 A1* | 10/2014 | Miyazaki | G06F 3/0486 715/769 |
| 2015/0015476 A1* | 1/2015 | Yanev | G06F 3/0487 345/156 |
| 2015/0033159 A1* | 1/2015 | Cho | G06F 3/04842 715/765 |
| 2016/0011719 A1* | 1/2016 | Andersson | G06F 1/1694 345/178 |

* cited by examiner

METHOD OF PROVIDING USER INTERFACE OF DEVICE AND DEVICE INCLUDING THE USER INTERFACE

CROSS-REFERENCE TO RELATED APPLICATION(S)

This application claims the benefit under 35 U.S.C. § 119(a) of Korean patent application filed on Jul. 23, 2013 in the Korean Intellectual Property Office and assigned Serial number 10-2013-0086996, the entire disclosure of which is hereby incorporated by reference.

TECHNICAL FIELD

The present disclosure relates to a method of providing a user interface of a device and the device. More particularly, the present disclosure relates to a method of providing a user interface through which a user may accurately enter an input to a movable device even when the movable device is moving, and the device.

BACKGROUND

Various types of devices have been distributed with the development of technology. As devices are made small and light, portable electronic devices have been variously distributed. For example, devices, such as a portable phone, a Personal Digital Assistant (PDA), a tablet Personal Computer (PC), a smartphone, a notebook computer, etc., have been widely distributed.

Various types of input and output units may be included in portable electronic devices. For example, a touch panel that senses a touch input from a user to a device is used as an input unit in various types of devices.

When a user is using a portable electronic device, the portable electronic device may move. For example, if the user is using a smartphone in a moving vehicle, the smartphone held in a hand of the user shakes with the movement of the vehicle, and thus it may be difficult for the user to accurately touch a desired icon. As a device moves, the user may accidentally enter an input which differs from the intended input of the user.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method of providing a user interface that prevents a user from unintentionally entering an erroneous input even when a device moves due to various causes, and the device.

Additional aspects will be set forth in part in the description which follows and, in part, will be apparent from the description, or may be learned by practice of the presented various embodiments.

In accordance with an aspect of the present disclosure, a device configured to display an object for executing a preset operation according to a touch input of a user is provided. The device includes at least one sensor configured to sense a motion of the device, a processor configured to compare a motion value determined via the sensor with a preset threshold value and determines a movement value of the object based on a result of the comparison, and an Input/Output (I/O) unit which displays the object. At least one of a position and a size of the object may change according to the movement value of the object.

According to another aspect of the present disclosure, the I/O unit may sense whether a body part of the user approaches within a preset distance from the I/O unit. If the I/O unit senses that the body part of the user approaches within the preset distance from the I/O unit, the processor may determine the movement value of the object.

According to another aspect of the present disclosure, the movement value may be used to move the object in a direction opposite to a direction of the motion of the device sensed by the sensor.

According to another aspect of the present disclosure, the processor may determine the movement value of the object except for a perpendicular movement value of a direction perpendicular to a plane including the I/O unit among movement values determined by the sensor.

According to another aspect of the present disclosure, the processor may determine a motion vector from the motion value determined by the sensor and determine a reverse value of the motion vector as the movement value of the object.

According to another aspect of the present disclosure, the object may include at least one of an icon configured to execute a program, a text button configured to input text, a frame configured to input writing, an application execution screen, a menu select button, and an input button configured to control at least one of a widget and a program.

According to another aspect of the present disclosure, if a position in which the object is displayed moves out of a display area of the I/O unit based on the movement value of the object, the processor may change the size of the object based on the movement value of the object.

According of the another aspect of the present disclosure, if the motion value determined by the sensor is greater than or equal to the preset threshold value, the processor may determine the movement value of the object.

In accordance with another aspect of the present disclosure, a method of providing a user interface through a device is provided. The method includes displaying an object for executing a preset operation of the device on an I/O unit of the device, sensing a motion of the device via a sensor of the device, and changing at least one of a position in which the object is displayed and a size of the object, based on the sensed motion of the device.

According to another aspect of the present disclosure, the changing of the position in which the object is displayed may include comparing a motion value determined by the sensor with a preset threshold value and determining a movement value corresponding to the determined motion value based on the comparison result, and moving the position in which the object is displayed, based on the movement value.

According to another aspect of the present disclosure, the method may further include sensing whether a body part of a user approaches within a preset distance from the I/O unit. If the body part of the user is sensed as approaching within the preset distance from the I/O unit, the movement value of the object may be determined.

According to another aspect of the present disclosure, the movement value of the object may be determined except a perpendicular movement value of a direction perpendicular to a plane including the I/O unit among movement values sensed by the sensor.

According to another aspect of the present disclosure, a motion vector may be determined from the motion value determined by the sensor, and a reverse value of the motion vector may be determined as the movement value of the object.

According to another aspect of the present invention, if the motion value determined by the sensor is greater than or equal to the preset threshold value, the movement value of the object may be determined.

If a position in which the object is displayed leaves a display area of the I/O unit, a size of the object may be changed based on the motion of the device.

In accordance with another aspect of the present disclosure, a non-transitory computer-readable recording medium records thereon a program for executing the method.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the term "and/or" includes any and all combinations of one or more of the associated listed items. Expressions such as "at least one of," when preceding a list of elements, modify the entire list of elements and do not modify the individual elements of the list.

It will be understood that when an element, such as a layer, a region, or a substrate, is referred to as being "on," "connected to" or "coupled to" another element, it may be directly on, connected or coupled to the other element or intervening elements may be present. In contrast, when an element is referred to as being "directly on," "directly connected to" or "directly coupled to" another element or layer, there are no intervening elements or layers present. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof.

The present disclosure will now be described in detail with reference to the attached drawings.

Figure 1:
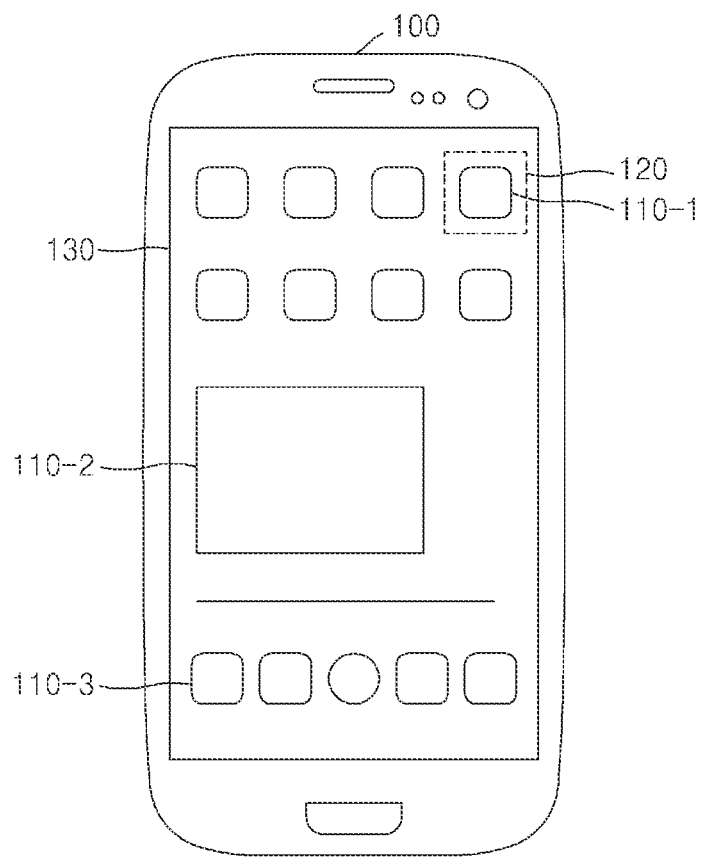
FIG. 1 is a view illustrating a user interface output from a device according to an embodiment of the present disclosure.

FIG. 1 is a view illustrating a user interface output from a device 100 according to an embodiment of the present disclosure.

Referring to FIG. 1, the device 100 may include a display 130. The device 100 may output a user interface through which a user interacts with the device, through the display 130.

The display 130 may be realized as various display types, such as a Liquid Crystal Display (LCD), a Thin Film Transistor-LCD (TFT-LCD), a 3-Dimensional (3D) display, an electrophoretic display, a Plasma Display Panel (PDP), an Organic Light-Emitting Diode (OLED), a flexible display, a transparent display, etc. However, the present disclosure is not limited thereto.

The user interface output through the display 130 may include at least one object 110-1, 110-2, and 110-3. The object 110-1 is a shape that is displayed on the display 130 for an input of the user. The objects 110-1, 110-2, and 110-3 may be displayed on the display 130, which is realized as a touch screen. When a body part of the user touches an input area 120, the device 100 may execute an operation (for example, an application) that is preset with respect to the object 110-1. For example, an application execution icon may be displayed on a touch screen of a smartphone. If the user's finger touches a position on the touch screen in which the application execution icon is displayed, the smartphone may execute an application corresponding to the application execution icon. The objects 110-1, 110-2, and 110-3 included in the user interface may include at least one of an icon for executing a program, a text input button for inputting a text, a frame for inputting writing, an application execution screen, a menu select button, and an input button for controlling a widget and a program.

According to an embodiment of the present disclosure, the display 130 may be realized as a touch screen that is combined with a touch panel for sensing a touch input of the user. The device 100 may set the input area 120 for receiving an input of the user for the object 110-1. If a touch input by a body part of the user is sensed in the input area 120, the device 100 may determine that an input of the user for selecting the object 110-1 is received.

The object 110-1 may be displayed in the input area 120 on the touch screen. For example, the object 110-1 may be displayed on the touch screen to correspond to the input area 120 or to be included in the input area 120.

Figure 2:
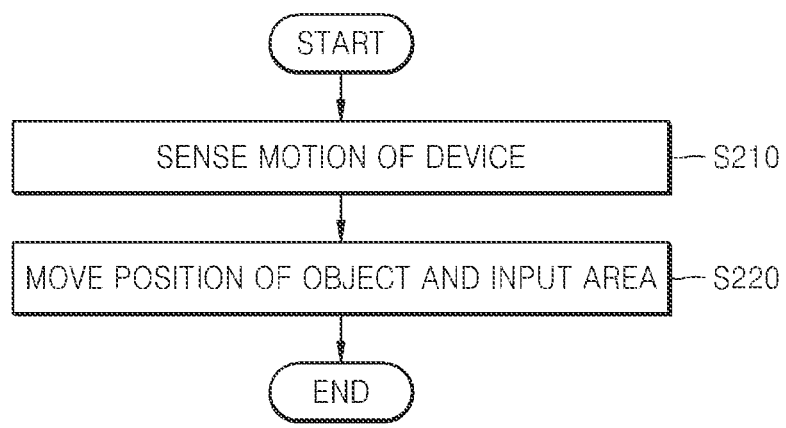
FIG. 2 is a flowchart illustrating a process of providing a user interface according to an embodiment of the present disclosure.

FIG. 2 is a flowchart illustrating a process of providing a user interface, according to an embodiment of the present disclosure.

Referring to FIG. 2, the device 100 may display an object for executing a preset operation of the device 100 through a display included in the device 100.

In operation S210, the device 100 senses motion of the device 100. Motion of the device 100 means that the device 100 physically moves. For example, if the device 100 is held in a hand of a user who is riding in a moving vehicle, the device 100 may sense any shaking of the device 100 that occurs due to movement of the vehicle. If the device 100 shakes due to an external shock, the device 100 may sense the external shock applied to the device 100.

The device 100 may include at least one sensor that senses the motion of the device 100. For example, the device 100 may include an accelerometer, a gyroscope sensor, a terrestrial magnetism sensor, or the like, but the present disclosure is not limited thereto.

In operation S220, the device moves a position of an object and/or an input area based on the motion of the device 100 sensed in operation S210, so that the object appears to the user as being displayed at a position where the object is displayed before the device 100 moves. The device 100 may move the position of the object in a direction for offsetting the motion of the device so that the position of the object is displayed to move together with the input area. As a result, even if the device 100 suddenly moves, the device 100 may induce the user to accurately touch the object or may move the input area according to an intention of the user in order to recognize a touch input of the user.

In operation S220, the device 100 may maintain a position of a background screen displayed on the display 130 and move only the position of the object. Alternatively, the device 100 may move a whole screen displayed on the display 130. Operation S220 may be variously realized according to various embodiments of the present disclosure.

According to another embodiment of the present disclosure, the device 100 may change the area size of the object and the size of the input area, instead of changing the position of the object, in operation S220.

Figure 3:
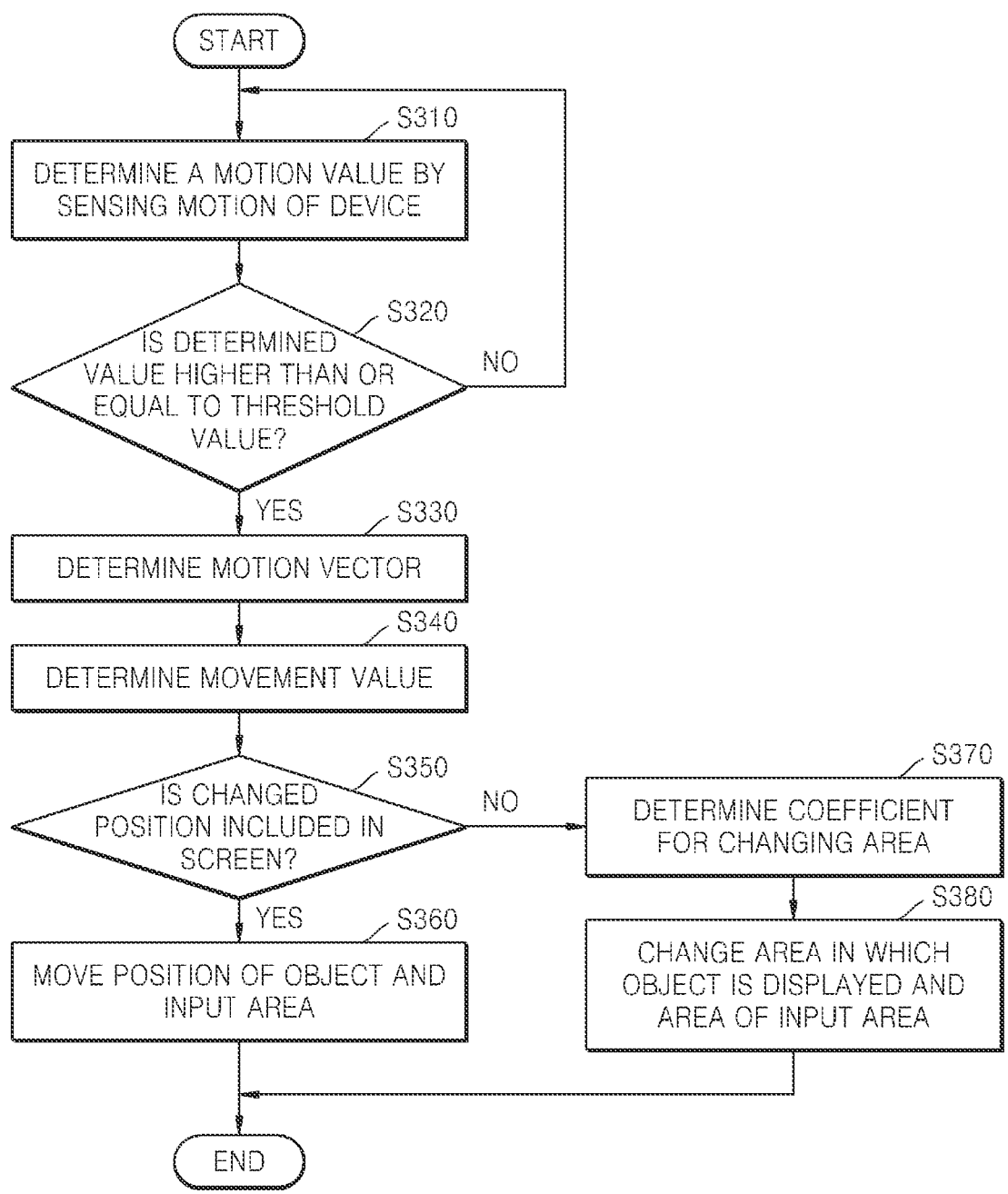
FIG. 3 is a flowchart illustrating a process of providing a user interface according to another embodiment of the present disclosure.

FIG. 3 is a flowchart illustrating a process of providing a user interface according to another embodiment of the present disclosure.

Referring to FIG. 3, in operation S310, the device 100 senses a motion of the device 100. The device 100 may sense the motion of the device 100 by using methods that differ according to types of sensors installed in the device 100.

According to an embodiment of the present disclosure, the device 100 may include a direction sensor that senses a direction of the device 100. The direction sensor may be a terrestrial magnetism sensor but is not limited thereto. Before detecting the motion, the device 100 may initialize a direction coordinate as a reference value and store the reference value. The device 100 may update a rotation angle from the initialized and stored direction coordinate periodically. Hereinafter, a rotation angle about an X axis is referred to as rx, and a rotation angle about a Y axis perpendicular to the X axis is referred to as ry. A basic setting value of the X axis is referred to as dx, and a basic setting value of the Y axis is referred to as dy. In the present specification, the X axis and the Y axis are referred to coordinate axes included on a plane including a surface of the display 130.

The device 100 may also include an accelerometer. The accelerometer may sense acceleration of the device 100 which occurs due to movement of the device 100. Acceleration sensed along the X axis is referred to as ax, and acceleration sensed along the Y axis is referred to as ay.

The device 100 may also include a gyroscope sensor. The gyroscope sensor may sense acceleration of the device 100 which occurs due to movement of the device 100. Acceleration sensed along the X axis is referred to as rx/s, and acceleration sensed along the Y axis is referred to as ry/s.

According to an embodiment of the present disclosure, a value (e.g., an acceleration value) determined by using a sensor value determined on a Z axis perpendicular to the plane including the surface of the display 130 may be ignored.

The device 100 may compare the value determined by the sensor with a preset threshold value. The device 100 may determine whether to move an object based on the comparison result in operation S320. For example, if the value determined by the sensor is greater than or equal to the preset threshold value, the device 100 executes a process for moving a position of the object. If ax is greater than or equal to preset value a, the device 100 may execute operations S330 through 380 for moving the position of the object. Operation S320 may be performed to determine whether the position of the object displayed on the device 100 needs to be moved.

However, according to an embodiment of the present disclosure, a method of comparing the value determined by the sensor with the preset threshold value may vary. As another example, if the value is ax, and ax is equal to a preset value −a, equal to a preset value a, or greater than a preset value −a and lower than a preset value a (where a>0), and ay is equal to a preset value −b, equal to a preset value b, or greater than preset range −b and lower than b (where b>0), the device 100 may determine that a shock is applied to the device 100 and execute a process for moving the position of the object. However, the present disclosure is not limited thereto.

In operation S330, the device 100 determines a motion vector based on the value determined by the sensor. According to an embodiment of the present disclosure, if the device 100 includes a direction sensor, a size of the motion vector may be determined as $\{(ax/a*n), (ay/b*m)\}$. A direction of the motion vector may be determined as $\{(rx-dx), (ry-dy)\}$. Here, n denotes a preset maximum movement distance of the device 100 along the X axis, and m denotes a preset maximum movement distance of the device 100 along the Y axis. However, the present disclosure is not limited thereto.

According to another embodiment of the present disclosure, if the device 100 includes a gyroscope sensor, the size of the motion vector may be determined as $\{(ax/a*n),$ (ay/b*m)}. The direction of the motion vector may be determined as {(rx/s*ds), (ry/s*ds)}. Here, n denotes a preset maximum movement distance of the device 100 along the X axis, m denotes a preset maximum movement distance of the device 100 along the Y axis, and ds denotes a unit time. However, the present disclosure is not limited thereto.

In operation S340, the device 100 determines a movement value of the object based on the determined motion vector. The movement value of the object refers to a direction in which and how far the object is to be moved. The movement value may include coordinates correspond to the determined motion vector.

According to an embodiment of the present disclosure, if the device 100 includes a direction sensor, a size of the movement value of the object may be determined as {(−1)*(ax/a*n), (−1)*(ay/b*m)}. The movement of an object in a direction towards given coordinates may be determined as {(rx−dx), (ry−dy)}. Here, n denotes a preset maximum movement distance of the device 100 along the X axis, and m denotes a preset maximum movement distance of the device 100 along the Y axis. However, the present disclosure is not limited thereto.

According to another embodiment of the present disclosure, if the device 100 includes a gyroscope sensor, the size of the movement value of the object may be determined as {(−1)*(ax/a*n), (−1)*(ay/b*m)}. The coordinate movement direction may be determined as {(−1)*(rx/s*ds), (−1)*(ry/s*ds)}. Here, n denotes a preset maximum movement distance that the device 100 may be moved along the X axis, m denotes a preset maximum movement distance that the device 100 may be moved along the Y axis, and ds denotes a unit of time. However, the present disclosure is not limited thereto.

According to an embodiment of the present disclosure, the movement value of the object determined in operation S340 may be used to move the object in a direction opposite to the direction of the motion sensed by the sensor. The device 100 may move the object in the direction opposite to the direction of the motion of the device 100 so that the position of the object does not move relatively with respect to a body part of a user or less moves relatively with respect to a body part of a user than the motion of the device 100.

If a position to which the object is moved from an initial position of the object according to the movement value of the object is included in a screen constituting the display 130 in operation S350, the device 100 moves the position in which the object is displayed and an input area corresponding to the object in operation S360.

If the position to which the object is moved from the initial position of the object according to the movement value of the object is located outside of the screen constituting the display 130 in operation S350, the device 100 determines a coefficient for modifying an area in which the object is displayed in operation S370. According to an embodiment of the present disclosure, the coefficient for modifying the area in which the object is displayed may be proportional to the value determined by the sensor. In operation S380, the device 100 modifies the area in which the object is displayed and the size of the input area based on the coefficient determined in operation S370. The device 100 may increase the area in which the object is displayed so that a user may accurately select the object. The object may be displayed such that the object is located inside the display 130, and thus the area in which the object is displayed may be modified instead of modifying the position of the object, thereby allowing the object to be accurately selected.

Figure 4:
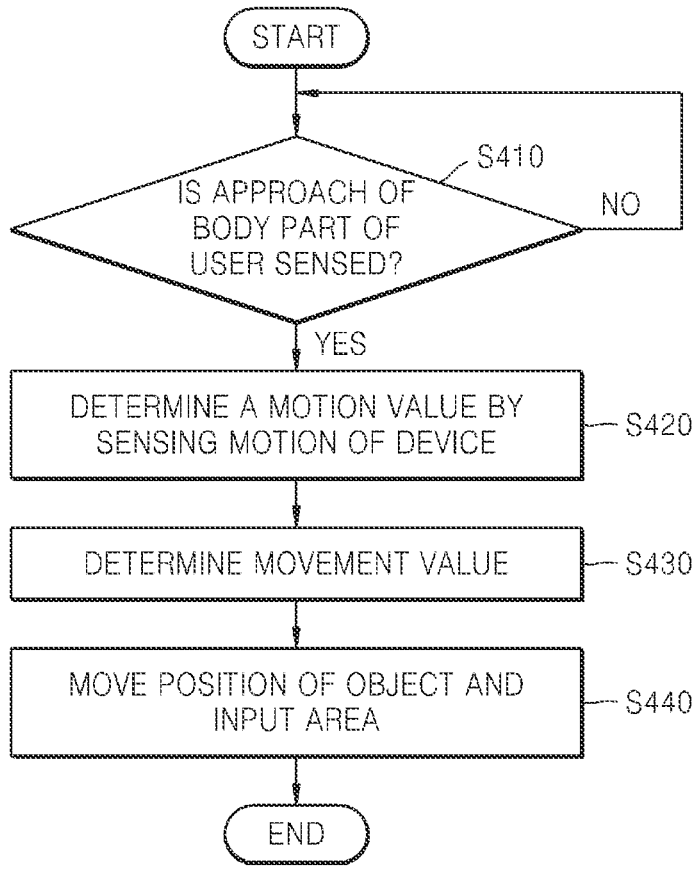
FIG. 4 is a flowchart illustrating a process of providing a user interface according to another embodiment of the present disclosure.
Figure 5:
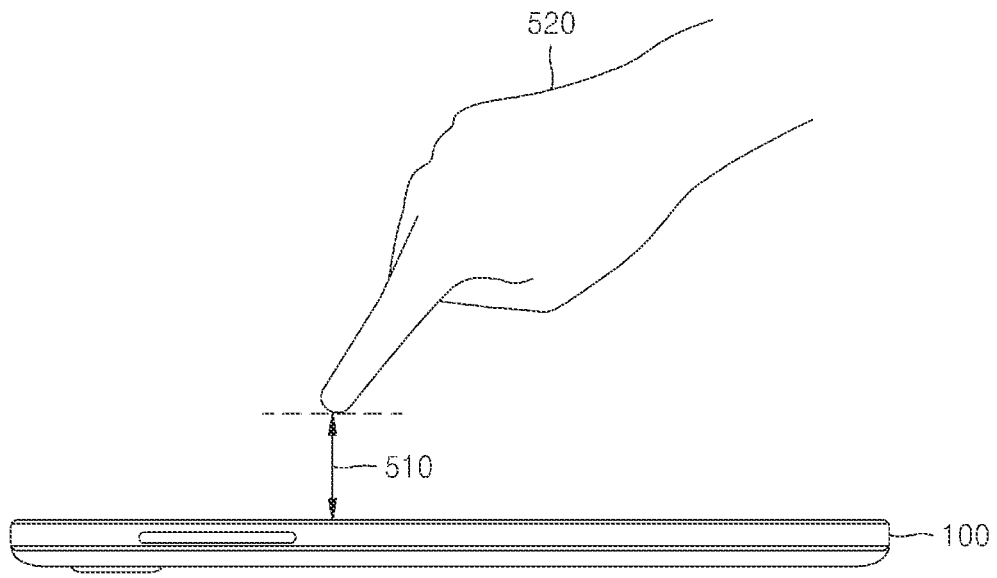
FIG. 5 is a view illustrating a device that senses an approach of a body part according to an embodiment of the present disclosure.

FIG. 4 is a flowchart illustrating a process of providing a user interface, according to another embodiment of the present disclosure. FIG. 5 is a view illustrating a device that senses an approach of a body part according to an embodiment of the present disclosure.

Referring to FIGS. 4 and 5, in operation S410, the device 100 determines whether a body part of a user approaches within a preset distance from the device 100 or the display 130.

Referring to FIG. 5, the device 100 may determine whether a body part 520 of a user approaches within a preset distance 510 from the device 100. The preset distance 510 may vary according to various embodiments of the present disclosure and may be set to a short distance of 3 cm or less.

According to an embodiment of the present disclosure, if the display 130 includes an electromagnetic induction type touch screen, the display 130 may determine whether the body part of the user approaches within a preset distance from the display 130 by using a proximity touch detection technology (hereinafter referred to as finger hovering detection technology). The finger hovering detection technology refers to a technology that, if the body part of the user, for example, a finger of the user, does not directly contact a touch screen but approaches within a preset distance from the touch screen, senses a change in current flow in a touch screen panel in the touch screen that occurs when the body part of the user approaches within the preset distance.

According to another embodiment of the present disclosure, the device 100 may use a proximity sensor, an infrared sensor, or the like to determine whether the body part 520 of the user approaches within the preset distance from the touch screen. However, the present disclosure is not limited thereto, and the device 100 may use various methods to determine whether the body part 520 of the user approaches within the preset distance from the touch screen.

In operation S420, the device 100 senses a motion of the device 100 by using a sensor of the device 100. In operation S430, the device 100 determines a movement value of an object based on the motion of the device 100 sensed by the sensor. In operation S440, the device 100, which determines the movement value of the object, moves a position of the object displayed on the display 130 and/or an input area corresponding to the object according to the determined movement value. According to an embodiment of the present disclosure, the device 100 may move the position of the object displayed on the display 130 so that the body part 520 of the user approaches within the preset distance from the touch screen and may move the input area corresponding to the object. For example, the user may use a finger to approach within a preset distance from a stop button displayed on a touch screen of a smartphone to touch to stop playing a moving picture when the moving picture is being played on the smartphone. While the user is approaching to touch the stop button with the finger, the user may accidentally bump into another person, and thus the smartphone may shake. The smartphone may display the stop button, which is displayed in proximity to the finger, in a position for offsetting a motion of the smartphone to physically contact the stop button with the finger.

Figure 6:
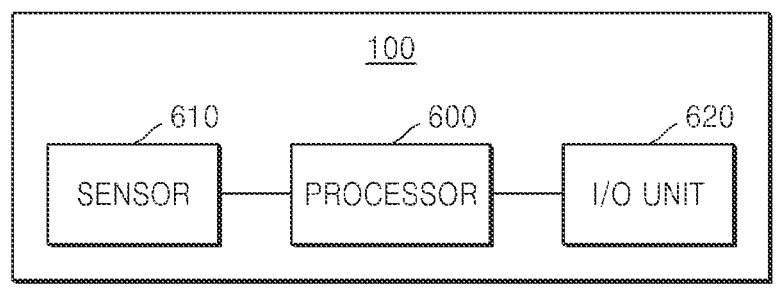
FIG. 6 is a block diagram illustrating a device according to an embodiment of the present disclosure.
Figure 7:
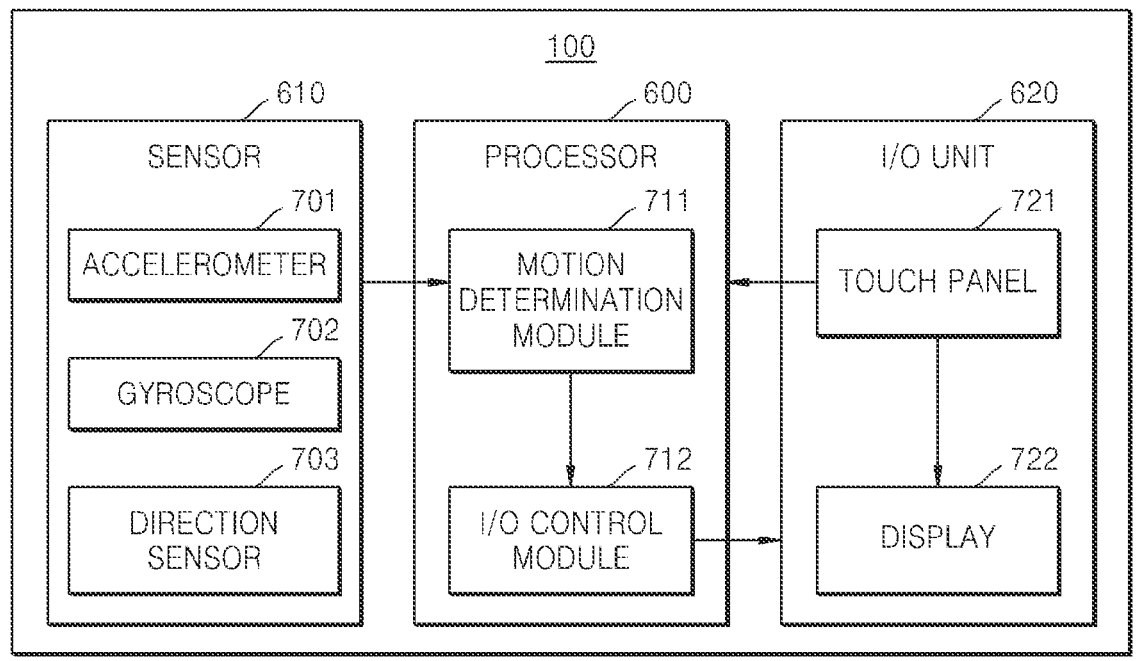
FIG. 7 is a detailed block diagram illustrating a device according to an embodiment of the present disclosure.

FIGS. 6 and 7 are block diagrams illustrating a structure of a device 100, according to an embodiment of the present disclosure.

Referring to FIGS. 6 and 7, the device 100 according to the present embodiment includes at least one sensor 610 that senses a motion of the device 100, a processor 600 that determines a movement value of an object by using a motion value determined by the sensor 610, and an Input/Output (I/O) unit 620 that recognizes an input of a user for the object. However, the elements illustrated in FIG. 6 may not be essential elements or the device 100 may be formed of elements different than the elements illustrated in FIG. 6. The device 100 may be realized by a number of elements larger than that illustrated, or some of the illustrated elements may be excluded.

For example, the device 100 according to the present embodiment may further include a communicator and a memory and exclude some of the sensors illustrated in FIG. 7.

The sensor 610 may sense the motion of the device 100 and transmit sensed information to the processor 600. According to an embodiment of the present disclosure, the sensor 610 may include at least one of an accelerometer 701, a gyroscope 702, and a direction sensor 703 but is not limited thereto. The accelerometer 701 may acquire information about acceleration that is sensed according to the motion of the device 100. The gyroscope 702 may acquire information about an angular speed that is sensed according to the motion of the device 100. The direction sensor 703 may sense a change of a direction of the device 100 according to the motion of the device 100. The direction sensor 703 refers to a sensor that may sense the direction of the device 100, such as a terrestrial magnetism sensor.

The processor 600 may generally control an overall operation of the device 100. The processor 600 may execute a program loaded in a memory (not shown) to control overall operations of the sensor 610, the I/O unit 620, etc.

The processor 600 may include a motion determination module 711 and an I/O control module 712. The motion determination module 711 according to the present embodiment may acquire sensed information from the sensor 610.

The motion determination module 711 that receives the obtained information from the sensor 610 may determine whether a value determined by the sensor 610 is within in a preset range. The motion determination module 711 may also determine a movement value of an object corresponding to the value determined by the sensor 610 based on the determination result. For example, the motion determination module 711 may compare a value of the acceleration, i.e., an acceleration value, with a preset threshold value and determine whether the acceleration value is greater than or equal to the preset threshold value. If the acceleration value is greater than or equal to the preset threshold value, the motion determination module 711 may determine that the movement value of the object corresponds to the value determined by the sensor 610.

According to another embodiment of the present disclosure, a touch panel 721 may sense whether a body part of a user approaches the device 100 or a display 722. If the body part of the user approaches the device 100 or the display 722, the motion determination module 711 may determine the movement value of the object.

According to another embodiment of the present disclosure, the motion determination module 711 may determine the movement value of the object except for a movement value corresponding to a coordinate axis perpendicular to a plane including a surface of the display 722 among movement values determined by the sensor 610.

According to another embodiment of the present disclosure, the motion determination module 711 may determine a motion vector and determine a reverse value of the motion vector as a coordinate value. For example, a size of the motion vector may be determined as $\{(a_x/a*n), (a_y/b*m)\}$. A direction of the motion vector may be determined as $\{(r_x-d_x), (r_y-d_y)\}$. Here, $a_x$ and $a_y$ respectively denote acceleration along the X axis and acceleration along the Y axis sensed by the accelerometer 701. $r_x$ and $r_y$ respectively denote a rotation angle about the X axis and a rotation angle about the Y axis sensed by the direction sensor 703. $d_x$ and $d_y$ respectively denote reference values set along the X axis and the Y axis. n denotes a preset maximum movement distance of the device 100 along the X axis. m denotes a preset maximum movement distance of the device 100 along the Y axis. The motion determination module 711 may determine a movement value that has size of $\{(-1)*(a_x/a*n), (-1)*(a_y/b*m)\}$ and has a coordinate movement direction of $\{(r_x-d_x), (r_y-d_y)\}$.

As another example, the size of the motion vector may be determined as $\{(a_x/a*n), (a_y/b*m)\}$. The direction of the motion vector may be determined as $\{(r_x/s*d_s), (r_y/s*d_s)\}$. Here, $a_x$ and $a_y$ respectively denote acceleration along the X axis and acceleration along the Y axis sensed by the accelerometer 701. $r_x/s$ and $r_y/s$ respectively denote rotation angular speeds about the X and Y axes sensed by the gyroscope 702. n denotes a preset maximum movement distance of the device 100 along the X axis. m denotes a preset maximum movement distance of the device 100 along the Y axis. However, the present disclosure is not limited to the present example.

According to an embodiment of the present disclosure, a coordinate movement value may be used to move an object in a direction opposite to the motion of the device 100 sensed by the sensor 610. The object may be moved in the direction opposite to the motion of the device 100 so that although the device 100 moves, an object desired by the user is further accurately selected.

Figure 8:
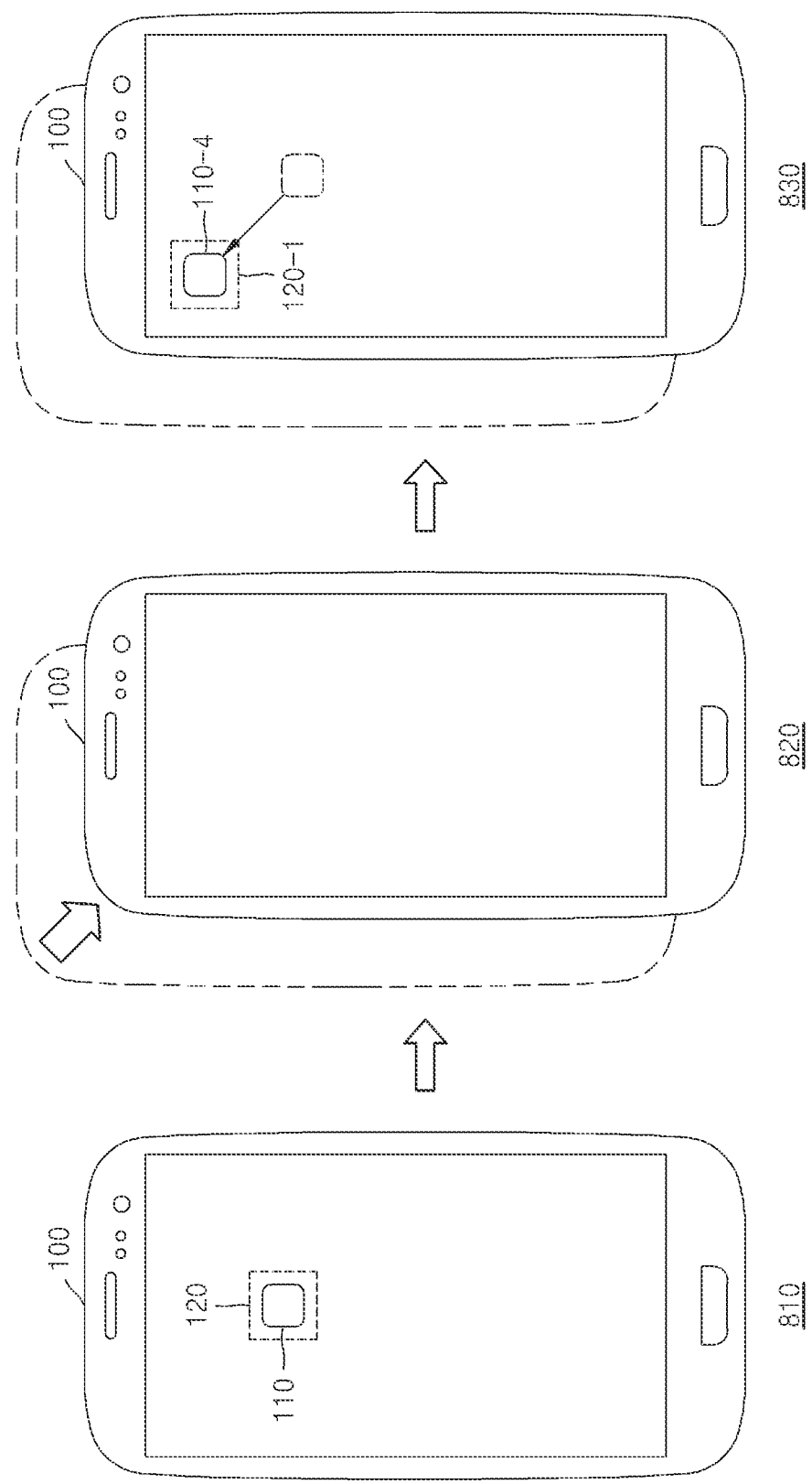
FIG. 8 is a view illustrating a user interface output from a device according to an embodiment of the present disclosure.

The I/O control module 712 may control the I/O unit 620 including the display 7220 to display a user interface including an object. If the motion determination module 711 determines a movement value of the object, the I/O control module 722 may control the display 722 to reset a position of the object displayed on the display 722 based on the movement value of the object and display the object in the reset position. An embodiment for moving a position in which an object is displayed is illustrated in FIG. 8.

Figure 9:
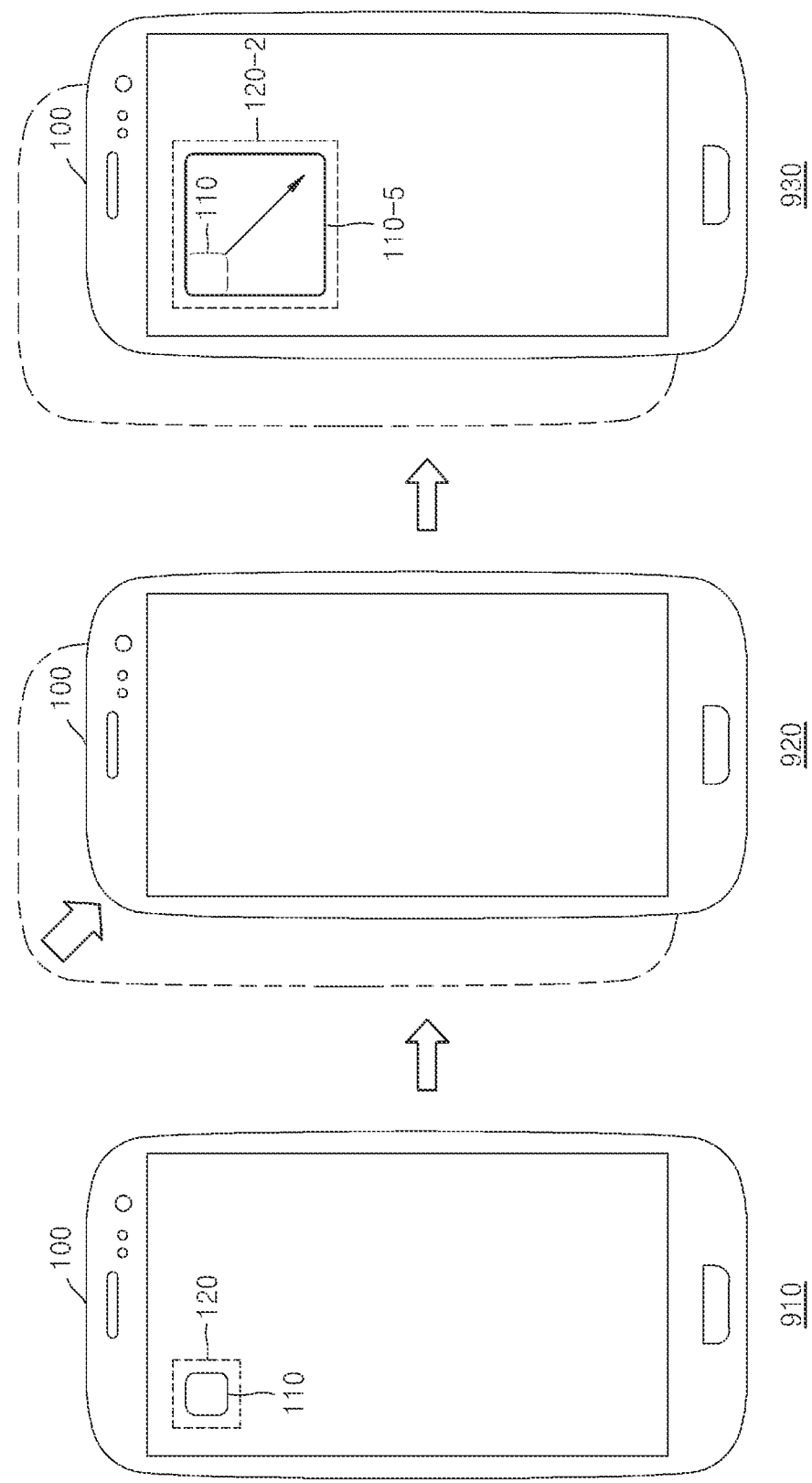
FIG. 9 is a view illustrating a user interface output from a device according to another embodiment of the present disclosure.

According to an embodiment of the present disclosure, if the position of the object reset based on the movement value of the object moves out of a displayable area of the display 722, the device 100 may change an area in which the object is displayed and an area of an input area, based on the movement value of the object. An embodiment for changing the area in which the object is displayed and the area of the input area is illustrated in FIG. 9.

The I/O unit 620 may display the object and receive an input of the user for the object. For example, the I/O input unit 620 may be realized as a touch screen in which a display and a touch panel form a layer structure, output a user interface, and may receive a touch input of the user for the displayed user interface.

The display 722 may output a video signal processed by the device 100. According to an embodiment of the present disclosure, the display 722 may output a user interface or an image including at least one object.

The touch panel 721 may sense a contact by the user and transmit coordinates where the contact by the user is sensed, to the processor 600.

According to an embodiment of the present disclosure, the I/O unit 620 may include I/O devices other than the touch panel 721 and the display 722. For example, the I/O unit 620 may include a unit for recognizing a gesture of the user or a means a unit for sensing a position of the body part of the user.

According to an embodiment of the present disclosure, the touch panel 721 and the display 722 may form a layer structure constituting a touch screen. The display 722 may be realized as various display types such as an LCD, a TFT-LCD, a 3D display, an electrophoretic display, a PDP, an OLED, a flexible display, a transparent display, and the like. The I/O unit 620 may also include two or more displays 722 according to the type of display realized by the device 100.

According to another embodiment of the present disclosure, the I/O unit 620 may determine whether the body part of the user approaches within a preset distance from the device 100 or the display 722. Here, finger hovering may be used. If the body part of the user approaches within a preset distance from the display 722, the motion determination module 711 may determine the movement value of the object. When the user wants to enter a touch input, the motion determination module 711 may change a position where the object is displayed.

FIG. 8 is a view illustrating a user interface output from a device, according to an embodiment of the present disclosure.

Referring to FIG. 8, the device 100 may display an object 110 (810). If a body part of a user contacts an input area 120, the device 100 may execute a preset operation of the object 110.

When the object 110 is displayed on the device 100 (810), the device 100 may move due to various causes (820). In this case, the device 100 may sense a motion of the device 100, change a position in which the object 110 will be displayed, and display an object 110-4 in the changed position (830). The user may select an input area 120-1 corresponding to the changed position to execute an operation of the device 100 that is preset with respect to the object 110.

According to an embodiment of the present disclosure, the device 100 may move all images displayed on a display to move a position in which an object is displayed. According to another embodiment of the present disclosure, if the body part of the user approaching the display is sensed, the device 100 may move only a position in which an object is displayed in a place close to the sensed body part of the user. For example, when a moving picture is being played on a smartphone, the user may approach a stop button displayed on a touch screen of the smartphone with a finger to stop playing the moving picture. When the user wants to physically contact the stop button with the finger, the user may bump into another person, and thus the smartphone may shake. The smartphone may display the stop button, which is displayed in proximity to the finger, in a position for offsetting a motion of the smartphone, to contact the stop button with the finger. Except a stop button, a position of another image displayed on the touch screen may not be moved. However, the present disclosure is not limited thereto.

FIG. 9 is a view illustrating a user interface output from a device, according to another embodiment of the present disclosure.

Referring to FIG. 9, the device 100 may display an object 110 (910). If a body part of a user contacts an input area 120, the device 100 may execute a preset operation corresponding to the object 110.

When the object 110 is displayed on the device 100 (910), a shock may be applied to the device 100, and thus the device may move (920). If a position of the object 110 is moved as shown in FIG. 9, a position in which the object 110 will be displayed may move out of a display of the device 100. Therefore, according to an embodiment of the present disclosure, the device 100 may modify an area in which the object 110 is displayed. The device 100 may display an object 110-5 that is further enlarged, to provide a user interface through which the user may more easily select the object 110 (930). Here, an input area 120-2 corresponding to an object 110-5 may be enlarged to correspond to an area of the object 110-5 that is enlarged.

The present disclosure may be embodied as a recording medium including a command executable by a computer such as a program module executed in a computer. A computer-readable medium may be an arbitrary usable medium that may be accessed by a computer and may include all types of such as volatile and nonvolatile media, and separable and non-separable media. Also, the computer-readable medium may include all of a computer storage medium and a communication medium. The computer storage medium may include all of volatile and nonvolatile media, and separable and non-separable media that are embodied with an arbitrary method or technology for storing information such as a computer-readable command, a data structure, a program module, or other data. The communication medium includes a computer-readable command, a data structure, a program module, other data of a modulated data signal, or other transmission mechanisms and an arbitrary information transmission medium. The computer-readable medium may be a hard disk, a Compact Disk (CD), a Digital Versatile Disk (DVD), a Blue-ray memory, a flash memory, or the like. A recording medium according to an embodiment of the present disclosure may record a program through which the device 100 displays an object for executing a preset operation through a display of the device 100, senses a motion of the device 100 through a sensor of the device 100, and moves a position of the object and/or an input area based on the sensed motion. Also, according to another embodiment of the present disclosure, the recording medium may record a program for areas of the object and/or the input area instead of positions of the object and/or the input area. According to another embodiment of the present disclosure, the recording medium may record a program for sensing an approach of a body part of a user and, if the approach of the body part of the user is sensed, changing the positions of the object and/or the input area.

It should be understood that the various embodiments described therein should be considered in a descriptive sense only and not for purposes of limitation. Descriptions of features or aspects within each embodiment should typically be considered as available for other similar features or aspects in other various embodiments. For example, each element that has been described as a single type may be executed in a distribution fashion, and elements that have been described as being executed in a distribution fashion may be combined with one another to be executed.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A device configured to display an object for executing a preset operation according to a touch input of a user, the device comprising:
   at least one sensor configured to sense a motion of the device;
   a processor configured to compare a motion value determined via the sensor with a preset threshold value and to determine a movement value of the object based on a result of the comparison; and an Input/Output (I/O) unit configured to display the object, wherein the processor is further configured to:
change a position of the object according to the movement value of the object, and
in response to the changed position of the object moving out of a display area of the I/O unit, change a size of the object based on the movement value of the object.

2. The device of claim 1,
wherein the I/O unit senses whether a body part of the user approaches within a preset distance from the I/O unit, and
wherein if the I/O unit senses that the body part of the user approaches within the preset distance from the I/O unit, the processor determines the movement value of the object.

3. The device of claim 1, wherein the movement value is used to move the object in a direction opposite to a direction of the motion of the device sensed by the sensor.

4. The device of claim 1, wherein the processor determines the movement value of the object except for a perpendicular movement value of a direction perpendicular to a plane comprising the I/O unit among movement values determined by the sensor.

5. The device of claim 1, wherein the processor determines a motion vector from the motion value determined by the sensor and determines a reverse value of the motion vector as the movement value of the object.

6. The device of claim 1, wherein the object comprises at least one of an icon configured to execute a program, a text button configured to input text, a frame configured to input writing, an application execution screen, a menu select button, and an input button configured to control at least one of a widget and a program.

7. The device of claim 1, wherein if a position in which the object is displayed moves out of the display area of the I/O unit based on the movement value of the object, the processor changes the size of the object based on the movement value of the object.

8. The device of claim 1, wherein if the motion value determined by the sensor is greater than or equal to the preset threshold value, the processor determines the movement value of the object.

9. The device of claim 1, wherein the I/O unit displays the object such that at least one of a position and a size of the object changes according to the movement value of the object.

10. The device of claim 2, wherein the processor moves the object at a location on the device corresponding to a location of the sensed body part of the user.

11. A method of providing a user interface through a device, the method comprising:

displaying an object for executing a preset operation of the device on an Input/Output (I/O) unit of the device;
sensing a motion of the device via a sensor of the device;
comparing a motion value determined via the sensor with a preset threshold value;
determining a movement value of the object based on a result of the comparison;
changing a position of the object according to the movement value of the object; and
in response to the changed position of the object moving out of a display area of the I/O unit, changing a size of the object based on the movement value of the object.

12. The method of claim 11, wherein the changing of the position in which the object is displayed comprises:
comparing a motion value determined by the sensor with a preset threshold value and determining a movement value corresponding to the determined motion value based on the comparison result; and
moving the position in which the object is displayed, based on the movement value.

13. The method of claim 12, further comprising:
sensing whether a body part of a user approaches within a preset distance from the I/O unit,
wherein if the body part of the user is sensed as approaching within the preset distance from the I/O unit, the movement value of the object is determined.

14. The method of claim 12, wherein the movement value is used to move the object in a direction opposite to a direction of the motion of the device sensed by the sensor.

15. The method of claim 12, wherein the movement value of the object is determined except a perpendicular movement value of a direction perpendicular to a plane comprising the I/O unit among movement values sensed by the sensor.

16. The method of claim 12, wherein a motion vector is determined from the motion value determined by the sensor, and a reverse value of the motion vector is determined as the movement value of the object.

17. The method of claim 12, wherein if the motion value determined by the sensor is greater than or equal to the preset threshold value, the movement value of the object is determined.

18. The method of claim 11, wherein the object comprises at least one of an icon configured to execute a program, a text button configured to input text, a frame configured to input writing, an application execution screen, a menu select button, and an input button configured to control a widget and a program.

19. The method of claim 11, wherein if a position in which the object is displayed leaves the display area of the I/O unit, the size of the object is changed based on the motion of the device.

20. A non-transitory computer-readable recording medium having recorded thereon a program for executing the method of claim 11.

* * * * *